US012754639B2

(12) United States Patent
Estiban et al.

(10) Patent No.: US 12,754,639 B2
(45) Date of Patent: Oct. 6, 2026

(54) CONTROLLER FOR ABLUTIONARY SETTINGS

(71) Applicant: Kohler Mira Limited, Gloucestershire (GB)

(72) Inventors: Marwan Estiban, Kohler, WI (US); Govinda Rao Koyala, Kohler, WI (US); Krishna C Poduru, Kohler, WI (US); Richard Mead, Gloucestershire (GB); Adam May, Gloucestershire (GB)

(73) Assignee: Kohler Mira Limited, Cheltenham (GB)

( * ) Notice: Subject to any disclaimer, the term of this patent is extended or adjusted under 35 U.S.C. 154(b) by 215 days.

(21) Appl. No.: 17/153,346

(22) Filed: Jan. 20, 2021

(65) Prior Publication Data

US 2022/0229532 A1 Jul. 21, 2022

(51) Int. Cl.
*G06F 3/041* (2006.01)

(52) U.S. Cl.
CPC ........ *G06F 3/04184* (2019.05); *G06F 3/0412* (2013.01)

(58) Field of Classification Search
CPC ............................ G06F 3/04184; G06F 3/0412
See application file for complete search history.

(56) References Cited

U.S. PATENT DOCUMENTS

| | | | | |
|---|---|---|---|---|
| 9,389,769 | B1 * | 7/2016 | O'Keeffe | G02B 6/0078 |
| 2007/0241203 | A1 * | 10/2007 | Wagner | F24F 11/30 236/1 C |
| 2008/0079857 | A1 | 4/2008 | Kim et al. | |
| 2013/0120283 | A1 | 5/2013 | Tung et al. | |
| 2013/0147764 | A1 * | 6/2013 | Chaji | H01L 51/5284 345/207 |
| 2015/0322652 | A1 * | 11/2015 | Mazz | G05D 7/0623 137/583 |

FOREIGN PATENT DOCUMENTS

| | | | | | |
|---|---|---|---|---|---|
| CN | 203066344 | | | 7/2003 | |
| CN | 102645989 | A | * | 8/2012 | |
| CN | 208818976 | U | * | 5/2019 | |
| CN | 209090608 | U | * | 7/2019 | |
| CN | 111026292 | A | * | 4/2020 | G06F 3/0412 |
| CN | 111972920 | A | * | 11/2020 | |
| CN | 112700714 | A | * | 4/2021 | |
| EP | 2873999 | | | 5/2015 | |
| JP | 2003248434 | A | * | 9/2003 | |
| JP | 2021086256 | A | * | 6/2021 | |
| WO | WO-2019241971 | A1 | * | 12/2019 | |

* cited by examiner

*Primary Examiner* — Ricardo Osorio
(74) *Attorney, Agent, or Firm* — Husch Blackwell LLP

(57) ABSTRACT

A controller for use in a wet environment such as an ablutionary setting includes a display for displaying information related to the operation of a fluid delivery system. The display includes a light source, a semi-transparent layer, and a touch interface configured to provide an input to the controller. The light source and the semi-transparent layer are configured such that the semi-transparent layer absorbs or reflects light transmitted towards the light source and allows light transmitted from the light source to be transmitted from the display, such that the light source appears hidden when light is not transmitted from the light source.

16 Claims, 13 Drawing Sheets

CONTROLLER FOR ABLUTIONARY SETTINGS

BACKGROUND

This disclosure relates to a controller for use in a wet environment such as an ablutionary setting. The disclosure also relates to a fluid delivery system, in particular a plumbing or ablutionary system comprising such a controller, and a method of manufacturing a controller.

Controllers for use in ablutionary settings include, for example, digital shower controllers. A digital shower controller typically comprises a manually operated mechanical input portion used to actuate an electronic switch. The electronic switch forms part of a control circuit which is typically used to control one or more characteristics of water delivered by a shower. For instance, the electronic switch may form part of a control circuit used to control actuation of an electronic valve, e.g. a solenoid valve. The electronic valve in turn may control the supply of water to a showerhead in response to actuation of the electronic switch. Parts of the mechanical input portion may wear over time, and the mechanical input portion may become difficult to use due to the build-up of debris between moving parts. The number of different inputs provided by the mechanical input portion is also fixed and the inputs cannot be easily modified.

It is known to provide a digital shower controller with an electronic display for indicating to a user various functions being performed by the controller. For example, the display may indicate a target water temperature which the controller will deliver through control of the electronic valve. Such displays typically reflect light when inactive, meaning that dirt located on the surface of the display is visible. In addition, the edges of the display may be visible relative to the surrounding housing of the controller. These effects result in an undesirable appearance.

SUMMARY

An exemplary embodiment relates to a controller for use in a wet environment such as an ablutionary setting, comprising a display for displaying information related to the operation of a fluid delivery system. The display includes a light source; a semi-transparent layer; and a touch interface configured to provide an input to the controller. The light source and the semi-transparent layer are configured such that the semi-transparent layer absorbs or reflects light transmitted towards the light source and allows light transmitted from the light source to be transmitted from the display, such that the light source appears hidden when light is not transmitted from the light source.

Another exemplary embodiment relates to a fluid delivery system that includes a fluid delivery device and a controller. The controller comprises a display for displaying information related to the operation of a fluid delivery system, the display a light source, a semi-transparent layer, and a touch interface configured to provide an input to the controller. The light source and the semi-transparent layer are configured such that the semi-transparent layer absorbs or reflects light transmitted towards the light source and allows light transmitted from the light source to be transmitted from the display, such that the light source appears hidden when light is not transmitted from the light source; and wherein the controller is operable to control one or more characteristics of the fluid delivered, in use, by the fluid delivery device.

Another exemplary embodiment relates to a method of manufacturing a controller for use in a wet environment such as an ablutionary setting, the controller comprising a display for displaying information related to the operation of a fluid delivery system and for providing an input to the controller, the display comprising a light source, a semi-transparent layer, and a touch interface. The method includes providing a light source, a semi-transparent layer, and a touch interface; and configuring the light source and the semi-transparent layer such that the semi-transparent layer absorbs or reflects light transmitted towards the light source and allows light transmitted from the light source to be transmitted from the display, such that the light source appears hidden when light is not transmitted from the light source.

BRIEF DESCRIPTION OF THE DRAWINGS

Various embodiments will now be described, by way of example only, with reference to the accompanying drawings.

DETAILED DESCRIPTION

Figure 1:
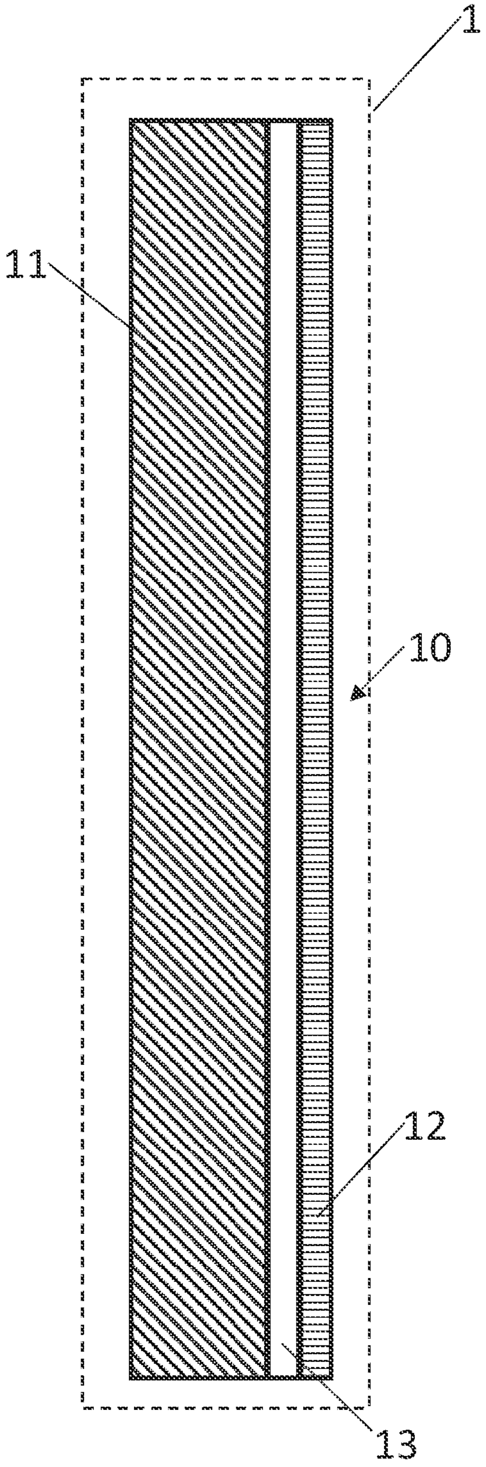
FIG. 1 shows a schematic cross-sectional side view of a controller according to an embodiment.

According to a first aspect, there is provided a controller for use in a wet environment such as an ablutionary setting. The controller comprises a display for displaying information related to the operation of a fluid delivery system. The display comprises a light source, a semi-transparent layer, and a touch interface configured to provide an input to the controller. The light source and the semi-transparent layer are configured such that the semi-transparent layer absorbs or reflects light transmitted towards the light source and allows light transmitted from the light source to be transmitted from the display, such that the light source appears hidden when light is not transmitted from the light source.

The dual functionality of the display, i.e. displaying information and providing an input to the controller, may remove the requirement for additional components.

The touch interface may comprise any suitable means for providing an input to the controller in response to a touching motion performed by a user of the controller. The touching motion may comprise direct or indirect physical contact, for example between a user's finger and the touch interface. In other examples, the touching motion may comprise a user moving their finger in proximity with the touch interface without the need for physical contact. For example, the touching motion may comprise a user moving their finger to a predetermined distance from the touch interface. For example, the predetermined distance may be at least 1 mm and/or up to 10 mm, or at least 1 mm and/or up to 5 mm, or at least 5 mm and/or up to 10 mm. The touch interface may comprise any suitable touch interface, for example one or more of a capacitive touch interface, a resistive touch interface, a surface acoustic wave interface, or an infrared interface.

The touch interface may be a physical touch interface layer. For example, where the touch interface comprises a capacitive touch interface or a resistive touch interface, the touch interface may be a physical touch interface layer and the touching motion described above may comprise direct physical contact between a user's finger, for example, and the physical touch interface layer. Alternatively, the touch interface may not be a physical touch interface layer. For example, where the touch interface comprises a surface acoustic wave interface, the touch interface may be a layer of ultrasonic waves. In another example, where the touch interface comprises an infrared interface, the touch interface may be a layer of infrared light.

The touch interface may be at least partially transparent. The touch interface may be semi-transparent or transparent.

The touch interface may be formed separately from the semi-transparent layer. The touch interface may be arranged between the light source and the semi-transparent layer, or the semi-transparent layer may be arranged between the light source and the touch interface. The touch interface and the light source may at least partially overlap as viewed in a direction perpendicular to the front of the controller.

The touch interface may not be arranged between the light source and the semi-transparent layer, or the semi-transparent layer may not be arranged between the light source and the touch interface. The touch interface may be spaced from the light source in a direction parallel to the front of the controller, such that the touch interface and the light source do not overlap. For example, the touch interface may be spaced from the light source in a direction parallel to the front of the controller such that the touch interface is spaced to the side of the light source.

The semi-transparent layer may be integrally formed with the touch interface. For example, where the touch interface is a physical touch interface layer, the physical touch interface layer may be treated or otherwise processed such that the touch interface provides the semi-transparent layer. In another example, where the touch interface is a physical touch interface layer, the semi-transparent layer may be first formed separately from the physical touch interface layer before being formed integrally with the physical touch interface layer, for example using an in-mold labelling (IML) process. The semi-transparent layer may be otherwise suitably printed on or bonded to the physical touch interface layer or vice versa.

One or more of the opacity of the semi-transparent layer, the intensity of light transmitted by the light source, and a maximum distance between the light source and the semi-transparent layer may be selected such that the semi-transparent layer absorbs or reflects light transmitted towards the light source and allows light transmitted from the light source to be transmitted from the display, such that the light source appears hidden when light is not transmitted from the light source. One or more of the opacity of the semi-transparent layer, the intensity of light transmitted by the light source, and a maximum distance between the light source and the semi-transparent layer may be selected in dependence on an intensity of light transmitted towards the light source in use, such as ambient indoor lighting.

Ambient indoor lighting herein refers, for example, to light produced by a typical domestic ambient light source, such as an LED, CFL or halogen light bulb, within a typical domestic setting, such as an ablutionary setting (a bathroom for example). Such typical domestic light sources may emit light with an output in the range of 4-130 Watts. In use, the distance between the semi-transparent layer of the display and an ambient light source may be greater than 1 meter, greater than 2 meters, or greater than 5 meters, for example. The intensity of ambient indoor lighting measured at the semi-transparent layer typically may be in the range of 0.001-15 $Wm^{-2}$ (Watts per meters squared), for example.

The semi-transparent layer may have an opacity selected such that light transmitted towards the light source in use, for example ambient indoor lighting, is reflected or absorbed by the semi-transparent layer and light transmitted from the light source is transmitted through the semi-transparent layer. The semi-transparent layer may have an opacity selected in dependence on one or more of: the intensity of light transmitted towards the light source in use, for example ambient indoor lighting, as measured at the semi-transparent layer; the intensity of light transmitted by the light source as measured at the semi-transparent layer; and a maximum distance between the light source and the semi-transparent layer; such that the semi-transparent layer absorbs or reflects light transmitted towards the light source and allows light transmitted from the light source to be transmitted from the display, such that the light source appears hidden when light is not transmitted from the light source.

The light source may be configured to transmit light having an intensity measured at the semi-transparent layer greater than an intensity of light transmitted towards the light source in use, for example ambient indoor lighting, measured at the semi-transparent layer. The output of light transmitted by the light source may be in the range of 4-24 W, for example. The intensity of light transmitted by the light source measured at the semi-transparent layer may be at least 3 $kWm^{-2}$ and/or up to 2 $MWm^{-2}$, for example. Therefore, due to the relative distances of the ambient light source and the light source of the display from the semi-transparent layer, the intensity of light from the light source of the display measured at the semi-transparent layer may be orders of magnitude greater than the intensity of light from the ambient light source measured at the semi-transparent layer.

The intensity of light transmitted by the light source may be selected in dependence on one or more of: the intensity of light transmitted towards the light source in use, for example ambient indoor lighting; the opacity of the semi-transparent layer; and a maximum distance between the light source and the semi-transparent layer; such that the semi-transparent layer absorbs or reflects light transmitted towards the light source and allows light transmitted from the light source to be transmitted from the display, such that the light source appears hidden when light is not transmitted from the light source.

A maximum distance between the light source and the semi-transparent layer may be selected such that light emitted by the light source, in use, is transmitted through the semi-transparent layer. A maximum distance between the light source and the semi-transparent layer may be less than 10 mm, less than 5 mm, less than 4 mm, less than 3 mm, less than 2 mm, or less than 1 mm, for example. A maximum distance between the light source and the semi-transparent layer may be approximately 0 mm, for example, i.e. if the light source and the semi-transparent layer are in contact with one another across an entire surface area of a contacting surface of the light source and the semi-transparent layer. The maximum distance between the light source and the semi-transparent layer may be selected in dependence on one or more of: the intensity of light transmitted towards the light source in use, for example ambient indoor lighting; the intensity of light transmitted by the light source; and the opacity of the semi-transparent layer; such that the semi-transparent layer absorbs or reflects light transmitted towards the light source and allows light transmitted from the light source to be transmitted from the display, such that the light source appears hidden when light is not transmitted from the light source.

Advantageously, when the light source is not turned on, the edges or outline of the light source or any part thereof will not be visible under ambient lighting conditions. The light source appearing hidden when information is not displayed (i.e. when the light source is not turned on) reduces the visibility of any dirt located on the display. In addition, it enables the light source to appear continuous with the surroundings of the display. This advantageously improves the aesthetic appearance of the controller over known controllers which have a display which is not hidden when information is not being displayed.

The semi-transparent layer may cover a major portion of the light source. The semi-transparent layer may cover substantially all of the light source.

The touch interface may comprise a capacitive touch interface. The capacitive touch interface may comprise an indium tin oxide layer. The display may further comprise a conductive protective layer arranged over the top of the capacitive touch interface. In embodiments in which the capacitive touch interface is arranged between the light source and the semi-transparent layer, the semi-transparent layer may additionally function as a protective layer. In such embodiments, the semi-transparent layer may be electrically conductive to ensure full functionality of the capacitive touch interface.

The controller may further comprise a processor and a memory device. The memory device may comprise instructions which, when executed by the processor, perform the function of compensating for the presence of water droplets or other debris in contact with the display. In some embodiments, for example wherein the touch interface comprises a capacitive touch interface, the presence of debris in contact with the display may interfere with providing an input to the controller in response to a touching motion performed by a user of the controller. Compensating for the presence of debris in contact with the display may comprise differentiating between debris in contact with the display and a touching motion performed by the user.

The display may further comprise a transparent layer. The transparent layer may be arranged between the light source and the touch interface, or between the touch interface and the semi-transparent layer, or between the light source and the semi-transparent layer. The transparent layer may be used to provide a maximum distance between the light source and the semi-transparent layer, the maximum distance being selected such that light emitted by the light source, in use, is transmitted through the semi-transparent layer. Providing the maximum distance using the transparent layer instead of providing a gap between the light source and the touch interface, or between the touch interface and the semi-transparent layer, or between the light source and the semi-transparent layer may help to maintain the structural integrity of the display.

The transparent layer may comprise, or consist essentially of, a polymeric material, in particular a plastics material. Suitable materials may include a co-polyester variant, polycarbonate or poly methyl methacrylate (PMMA).

The transparent layer may comprise a concave formation. The transparent layer may be curved at least in part. For instance, an outer surface of the transparent layer may be convex.

The transparent layer may have a minimum thickness of at least 1 mm or at least 2 mm. The transparent layer may have a maximum thickness of up to 5 mm or up to 10 mm.

The semi-transparent layer may be disposed on a surface of the transparent layer by any suitable means.

The semi-transparent layer may be thinner than the transparent layer. The semi-transparent layer may have a substantially uniform thickness. The semi-transparent layer may have a thickness of up to or at least 0.1 mm or up to 0.2 mm.

The semi-transparent layer of any of the above described embodiments may be black or white. A black semi-transparent layer may improve the legibility of information displayed by the light source, whereas a white semi-transparent layer may be better suited to environments in which the intensity of the ambient lighting is greater. The semi-transparent layer may be any suitable color. Lighter colors in general will reflect more ambient lighting than they absorb, and darker colors in general will absorb more ambient lighting than they reflect. The color of the semi-transparent layer may be selected depending on the intensity of ambient lighting measured at the semi-transparent layer and/or to produce a desired aesthetic appearance.

A shape of a continuous outer edge of the semi-transparent layer as viewed in a direction extending from the semi-transparent layer toward the light source may be different to a shape of a continuous outer edge of the light source as viewed in the same direction. The light source may be rectangular, e.g. square, and one or both of the semi-transparent layer and the transparent layer may not be rectangular, e.g. square. In some embodiments, the shape of the light source may be any other shape that is different from the shape of the transparent layer and/or the semi-transparent layer. In some embodiments, the shapes of the light source, transparent layer and semi-transparent layer may all be different.

The configuration of the light source and the semi-transparent layer hides the edges of the light source, both when information is displayed by the light source and when information is not displayed. As such, the shape of the display as a whole takes the appearance of the shape of the semi-transparent layer and/or the transparent layer. The light source may comprise an electronic screen, and rectangular, e.g. square, electronic screens are typically cheaper than round electronic screens, for example. The combination of a round semi-transparent layer and/or transparent layer may therefore allow for a rectangular, e.g. square, electronic screen to be used while the appearance of the display as a whole is round.

The touch interface of any of the above described embodiments may comprise a resistive touch interface. A resistive touch interface may be advantageous in certain environments. In embodiments wherein the touch interface comprises a resistive touch interface, the presence of debris in contact with the display may be less likely to interfere with providing an input to the controller in response to a touching motion performed by a user of the controller.

The touch interface of any of the above described embodiments may comprise a surface acoustic wave interface or an infrared interface.

The light source may comprise an electronic screen. The electronic screen may comprise a liquid-crystal display. The liquid-crystal display may comprise a thin-film-transistor (TFT) liquid-crystal display. The light source may comprise one or more LEDs behind the liquid-crystal display to provide backlighting. The light source may comprise an LED screen.

The light source may comprise an LED. The light source may comprise an array of LEDs. One or more LEDs used to display information may be more suitable than an electronic screen in certain applications. LEDs in general require less power than electronic screens and so may be more suited to embodiments in which the controller is battery powered, for example.

The controller may be battery powered or may be configured to be powered by mains electricity.

According to another aspect, there is provided a fluid delivery system comprising the controller of any of the above described embodiments.

According to another aspect, there is provided a fluid delivery system comprising a fluid delivery device and the controller of any of the above described embodiments. The controller is operable to control one or more characteristics of the fluid delivered, in use, by the fluid delivery device.

The one or more characteristics of the fluid may comprise fluid flow and/or temperature.

The fluid delivery system may comprise a valve operable to control flow of fluid to the fluid delivery device and the controller may be operably connected to the valve.

The fluid delivery system may comprise a plurality of fluid delivery devices.

The controller may be configured to permit a user to select any combination of one or more of the fluid delivery devices.

The fluid delivery device(s) may comprise a sprayer, e.g. a shower head.

The fluid may be water.

The system may be coupled to a fluid supply, e.g. a plumbing system providing cold and/or hot water.

According to another aspect, there is provided a method of manufacturing a controller for use in a wet environment such as an ablutionary setting, the controller comprising a display for displaying information related to the operation of a fluid delivery system and for providing an input to the controller. The display comprises a light source, a semi-transparent layer, and a touch interface. The method comprises providing a light source, a semi-transparent layer, and a touch interface. The method further comprises configuring the light source and the semi-transparent layer such that the semi-transparent layer absorbs or reflects light transmitted towards the light source and allows light transmitted from the light source to be transmitted from the display, such that the light source appears hidden when light is not transmitted from the light source.

The method may comprise arranging the touch interface between the light source and the semi-transparent layer, or arranging the semi-transparent layer between the light source and the touch interface.

The display may further comprise a transparent layer. The method may further comprise providing a transparent layer and forming the semi-transparent layer integrally with the transparent layer.

The method may comprise applying the semi-transparent layer to the transparent layer using an in-mold labelling (IML) process. The method may comprise: inserting the semi-transparent layer in to a mold; injecting molten material in to the mold to form the transparent layer; and removing the transparent layer and the semi-transparent layer from the mold as a single piece.

The method may comprise forming the transparent layer using any suitable process, such as a plastic forming process, e.g. injection molding, or an additive manufacturing process.

The semi-transparent layer may be formed integrally with the transparent layer. The semi-transparent layer may be applied to the transparent layer by any suitable process, such as inkjet printing, laser printing, painting or adhesion.

Except where mutually exclusive, any of the features of any of the above described aspects may be employed mutatis mutandis in any of the other above described aspects.

Figure 2:
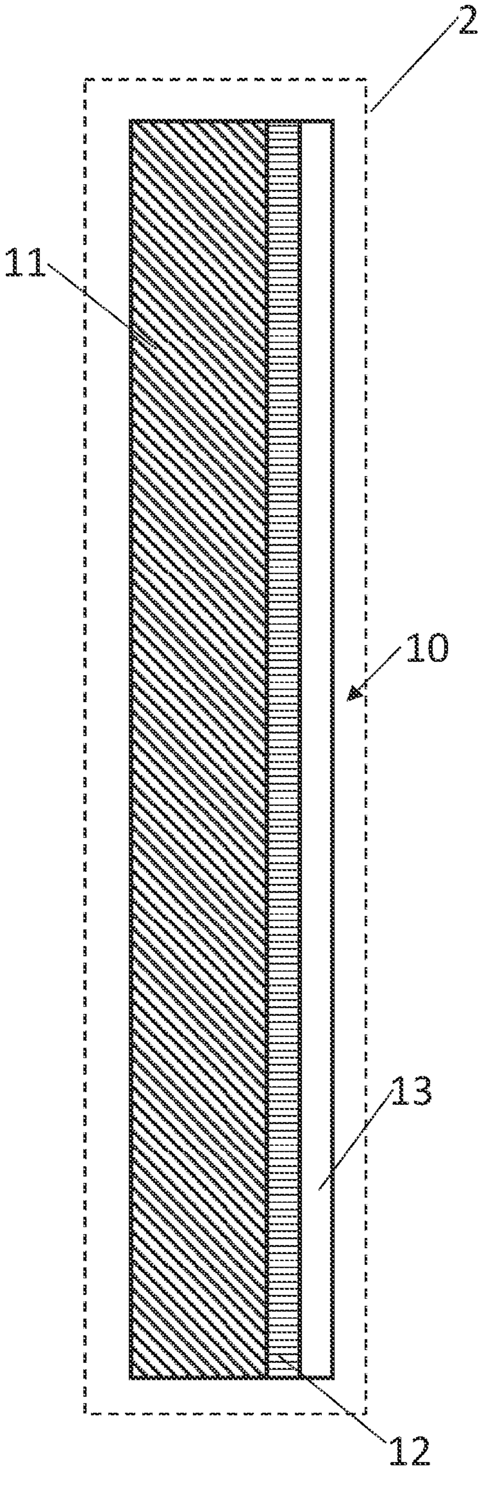
FIG. 2 shows a schematic cross-sectional side view of a controller according to another embodiment.

FIG. 1 shows a schematic cross-sectional side view of a controller 1, for use in a wet environment such as an ablutionary setting, according to an embodiment. FIG. 2 shows a schematic cross-sectional side view of a controller 2, for use in a wet environment such as an ablutionary setting, according to another embodiment. The controller 1 of FIG. 1 and the controller 2 of FIG. 2 have features in common and like reference numerals will be used to refer to like features. FIGS. 1 and 2 are merely illustrative and are not indicative of the relative sizes of the components or of the relative spacing between components of the respective controller 1, 2. Each controller 1, 2 comprises a display 10 for displaying information related to the operation of a fluid delivery system. The display 10 comprises a light source 11, a semi-transparent layer 12, and a touch interface 13 configured to provide an input to the controller 1, 2. The light source 11 and the semi-transparent layer 12 are configured such that the semi-transparent layer 12 absorbs or reflects light transmitted towards the light source 11 and allows light transmitted from the light source 11 to be transmitted from the display 10, such that the light source 11 appears hidden when light is not transmitted from the light source 11.

The semi-transparent layer 12 does not substantially allow light to be transmitted to the light source 11 when light is not transmitted from the light source 11. As such, substantially no light is reflected by the light source 11 when light is not transmitted from the light source 11. In certain embodiments, the light source 11 may comprise an electronic light source, such as an electronic screen or an LED. Light may not be transmitted from the light source 11 when the light source 11 is inactive, for example when there is no power being supplied to the light source 11. When light is transmitted from the light source 11, for example when power is provided to the light source 11, light is transmitted from the light source 11, and through the semi-transparent layer 12, allowing information represented by the light source 11 to be visible to a user.

The effect described in the preceding paragraph may be primarily achieved by selecting: the opacity of the semi-transparent layer 12; the intensity of light transmitted by the light source 11; and a maximum distance between the light source 11 and the semi-transparent layer 12. One or more of these variables may be selected in dependence on a given intensity of light incident on the display 10 in use, e.g. the intensity of ambient indoor lighting. The range of intensity of ambient lighting within a typical ablutionary setting, such as a domestic bathroom, and therefore the range of intensity of light incident on the display 10 in use, is readily attainable. The opacity of the semi-transparent layer 12, the intensity of light transmitted by the light source 11, and a maximum distance between the light source 11 and the semi-transparent layer 12 may be selected in dependence on this range to achieve the effect described in the preceding paragraph.

Within a typical ablutionary setting, there may be provided ambient indoor lighting produced by a typical domestic ambient light source, such as an LED, CFL or halogen light bulb. The opacity of the semi-transparent layer 12 may be such that the ambient indoor lighting is reflected or absorbed by the semi-transparent layer 12 and light emitted by the light source 11 is transmitted through the semi-transparent layer 12. The light source 11 may be configured to transmit light having an intensity measured at the semi-transparent layer greater than an intensity of the ambient indoor lighting measured at the semi-transparent layer 12.

In the embodiments of FIGS. 1 and 2, the touch interface 13 is a physical touch interface layer and the touch interface 13 is formed separately from the semi-transparent layer 12. In the embodiment of FIG. 1, the touch interface 13 is arranged between the light source 11 and the semi-transparent layer 12. In the embodiment of FIG. 2, the semi-transparent layer 12 is arranged between the light source 11 and the touch interface 13. The touch interface 13 and the light source 11 overlap as viewed in a direction perpendicular to the front of the controller 1, 2. In other embodiments, the touch interface 13 may not be arranged between the light source 11 and the semi-transparent layer 12, or the semi-transparent layer 12 may not be arranged between the light source 11 and the touch interface 13. The touch interface 13 may be spaced from the light source 11 in a direction parallel to the front of the controller 1, 2, such that the touch interface 13 and the light source 11 do not overlap. For example, the touch interface 13 may be spaced from the light source 11 in a direction parallel to the front of the controller 1, 2 such that the touch interface 13 is spaced to the side of the light source 11. In some embodiments, the semi-transparent layer 12 may be integrally formed with the touch interface 13.

In use, the display 10 may be configured to display information related to the operation of a fluid delivery system, for example a domestic shower. In some embodiments, the light source 11 may comprise an electronic screen, such as a liquid-crystal display (LCD) or an LED screen, configured to display information in the form of plain text and/or symbols. For example, the electronic screen may display a target water temperature to be delivered by the shower. In some embodiments, the light source 11 may comprise an LED or an array of LEDs. The LED or LEDs may be configured to display information by illuminating or not illuminating. For example, the LED or LEDs may illuminate when a target water temperature to be delivered by the shower has been reached.

The touch interface 13 may be configured to provide an input to the controller 1, 2. In use, the light source 11 may display one or more input options, for example in the form of one or more icons or symbols, or in the form of text. The touch interface 13 may be configured to allow a user to select each of the one or more input options through means of a touching motion in the proximity of the input option. The touching motion may comprise physical contact, for example between a user's finger and the touch interface. In other examples, the touching motion may comprise a user moving their finger in proximity with the touch interface without the need for physical contact. For example, a user may be able to select one of the input options by moving their finger to a predetermined distance from the touch interface in the proximity of the input option. The predetermined distance may be within the range of 1-10 mm.

In some embodiments, the touch interface 13 may not necessarily be configured to allow a user to select each of one or more input options displayed by the light source 11 through means of a touching motion in the proximity of the input option. The light source 11 may be configured to display information related to the operation of a fluid delivery system and the touch interface 13 may be configured to provide an input to the controller 10 independently of the information displayed by the light source 11. In such embodiments, the touch interface 13 is spaced to the side of the light source 11 as viewed from the front of the controller 1, 2.

In some embodiments, the touch interface 13 may comprise a capacitive touch interface. The operation of a capacitive touch interface is known, and so will not be discussed in detail here. In short, a capacitive touch interface typically comprises an electrically conductive layer which produces an electrostatic field when power is supplied to the electrically conductive layer. When a user of the controller contacts the capacitive touch interface, either directly or via a second conductive layer provided over the top of the touch interface, the touch interface reacts to the static electrical capacity of the user. This results in a decrease in capacitance of the electrically conductive layer, which is detected by sensors forming part of the touch interface. The controller 1, 2 may be configured to interpret this change in capacitance as an input to the controller 1, 2. The controller 1, 2 may be configured to produce a control signal in dependence on the change in capacitance.

The presence of debris, such as dirt or water droplets, in contact with the display 10 may interfere with providing an input to the controller 1, 2 in response to a user contacting the capacitive touch interface. In some embodiments, the controller 1, 2 may comprise software configured to compensate for the presence of debris in contact with the display 10. Compensating for the presence of debris may comprise differentiating between debris in contact with the display and a touching motion performed by the user.

In practice, the touch interface may comprise any suitable touch interface. Examples of touch interfaces which could be used include: a resistive touch interface, a surface acoustic wave interface, or an infrared interface.

In the embodiment of FIG. 1, there are no gaps between the light source 11 and the touch interface 13, or between the touch interface 13 and the semi-transparent layer 12. In some embodiments, the light source 11, touch interface 13 and semi-transparent layer 12 may all be of uniform thickness (as viewed from the side as shown in FIG. 1). The thickness of the touch interface 13 may be less than 10 mm such that the distance between the light source 11 and the semi-transparent layer 12 is less than 10 mm. In some embodiments, the thickness and the corresponding distance may be less than 5 mm. In some embodiments, the light source 11 and the touch interface 13 and/or the touch interface 13 and the semi-transparent layer 12 may be spaced apart. In such embodiments, the light source 11 and the touch interface 13 and/or the touch interface 13 and the semi-transparent layer 12 may be spaced apart such that the distance between the light source 11 and the semi-transparent layer 12 is less than 10 mm. In some embodiments, the distance may be less than 5 mm.

In the embodiment of FIG. 2, there are no gaps between the light source 11 and the semi-transparent layer 12. In other embodiments, the light source 11 and the semi-transparent layer 12 may be spaced apart. In some embodiments, the light source 11 and the semi-transparent layer 12 may both be of uniform thickness (as viewed from the side as viewed in FIG. 2). The spacing, the distance between the light source 11 and the semi-transparent 12 layer may be selected such that light transmitted from the light source 11 is transmitted through the semi-transparent layer 12 for a given intensity of light transmitted by the light source 11.

In some embodiments, one of the light source 11 and the semi-transparent layer 12 may be curved relative to the other of the light source 11 and the semi-transparent layer 12. As such, the distance between the light source 11 and semi-transparent layer 12 may vary over the surface areas of the light source 11 and the semi-transparent layer 12. The maximum distance between the light source 11 and semi-transparent layer 12 is selected such that light emitted by the light source 11 is transmitted through the semi-transparent layer 12.

Figure 3:
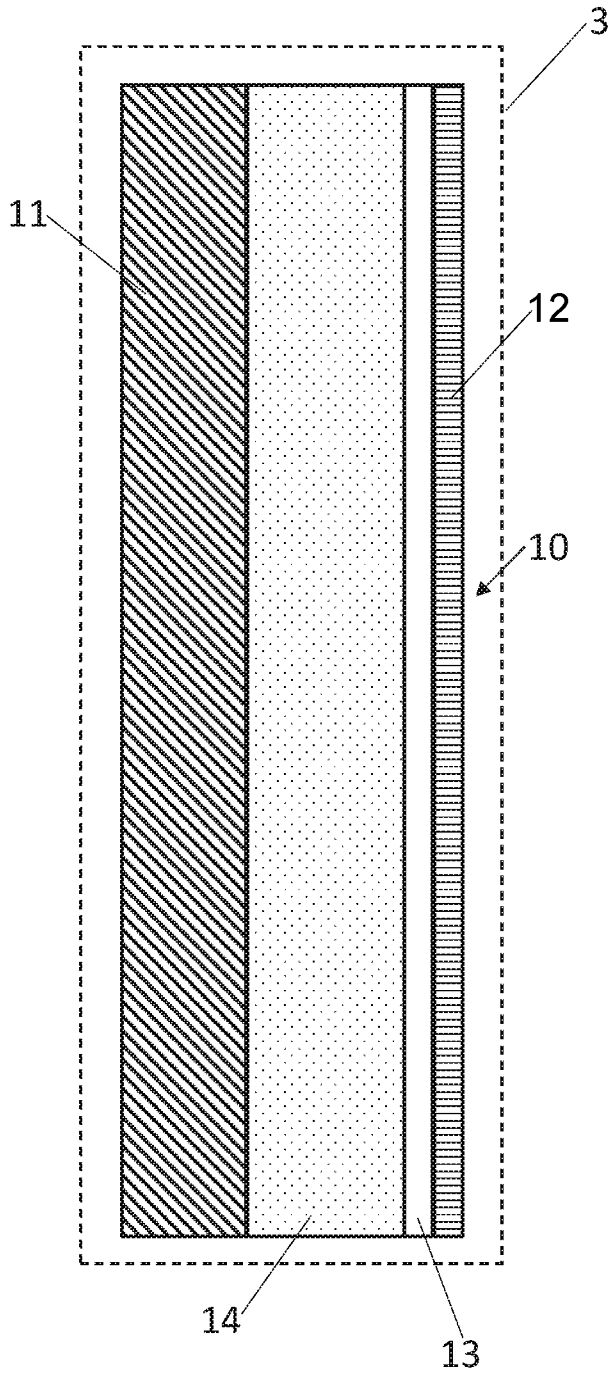
FIG. 3 shows a schematic cross-sectional side view of a controller according to another embodiment.

FIG. 3 shows a schematic cross-sectional side view of a controller 3, for use in a wet environment such as an ablutionary setting, according to another embodiment. The controller 3 of FIG. 3 has features in common with the controller 1 of FIG. 1 and the controller 2 of FIG. 2. Like reference numerals will be used to refer to like features. FIG. 3 is merely illustrative and is not indicative of the relative sizes of the components or of the relative spacing between components of the controller 3.

The display 10 of the controller 3 of FIG. 3 further comprises a transparent layer 14. In the embodiment of FIG. 3, the transparent layer 14 is arranged between the light source 11 and the touch interface 13. In other embodiments, the transparent layer 14 may be arranged between the touch interface 13 and the semi-transparent layer 12, or between the light source 11 and the semi-transparent layer 12. The transparent layer 14 increases the distance between the light source 11 and the semi-transparent layer 12 compared to the controller 1 of FIG. 1 and the controller 2 of FIG. 2, while maintaining the structural integrity of the display 10. The thickness of the transparent layer 14 (as viewed from the side as viewed in FIG. 3) may be selected in order to provide a maximum distance between the light source 11 and the semi-transparent layer 12, the maximum distance being selected such that light emitted by the light source 11, in use, is transmitted through the semi-transparent layer 12. The transparent layer 14 may have a minimum thickness of at least 1 mm or at least 2 mm. The transparent layer 14 may have a maximum thickness of up to 5 mm or up to 10 mm.

In some embodiments, the transparent layer 14 may be curved at least in part (as viewed from the side as viewed in FIG. 3). The transparent layer 14 may comprise a concave polycarbonate shell. In some embodiments, the transparent layer 14 may be planar or convex. In some embodiments, the transparent layer 14 may be formed of any suitable plastic. The transparent layer 14 may provide an efficient and cost-effective means of producing the semi-transparent layer 12 by disposing the semi-transparent layer 12 on a surface of the transparent layer 14 (e.g. as described in further detail below).

In the embodiments of FIGS. 1-3, the semi-transparent layer 12 over-lays the entire surface area of the light source 11. In some embodiments, the semi-transparent layer 12 may only over-lay a portion of the surface area of the light source 11. In embodiments in which the light source 11 comprises an electronic screen, for example, the semi-transparent layer 12 may only over-lay photo-active portions of the electronic screen.

Figure 4:
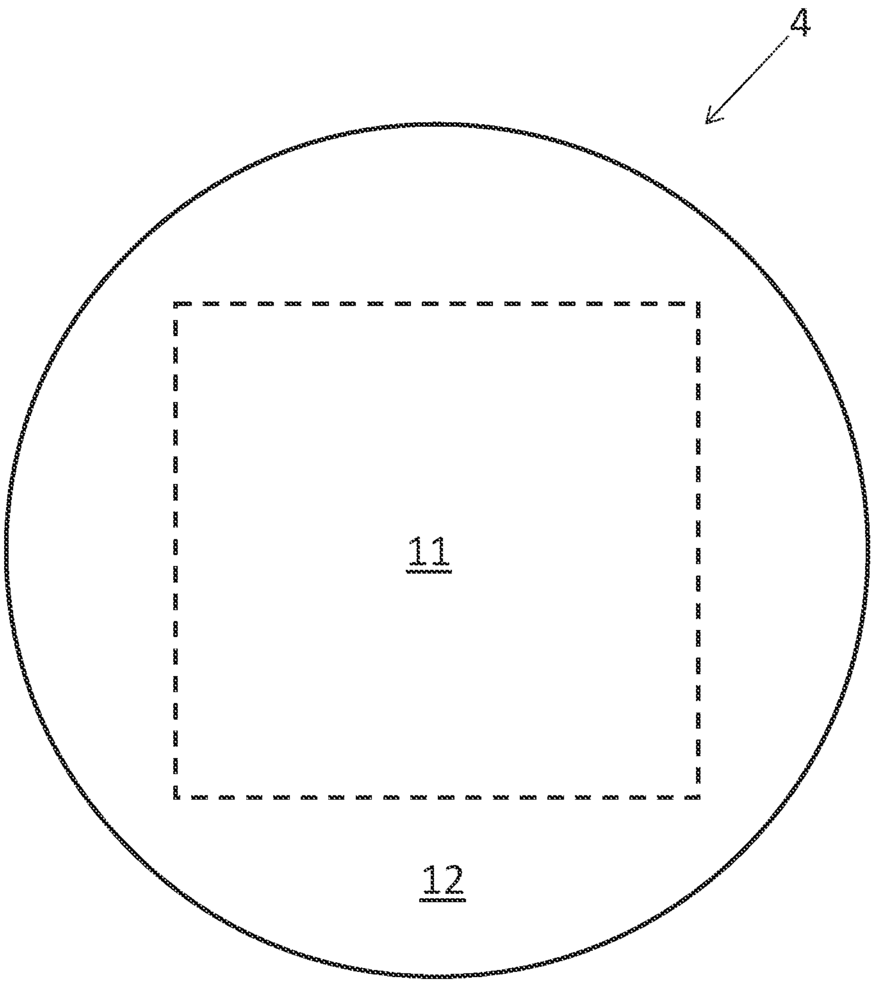
FIG. 4 shows a schematic front view of a controller according to another embodiment.

FIG. 4 shows a schematic front view of a controller 4, for use in a wet environment such as an ablutionary setting, according to another embodiment. The controller 4 of FIG. 4 has features in common with the controller 1 of FIG. 1, the controller 2 of FIG. 2 and the controller 3 of FIG. 3. Like reference numerals will be used to refer to like features. FIG. 4 is merely illustrative and is not indicative of the relative sizes of the components or of the relative spacing between components of the controller 4.

A continuous outer edge of the semi-transparent layer 12 is indicated by the solid line in FIG. 4 and a continuous outer edge of the light source 11 is indicated by the broken line in FIG. 4. The shape of the continuous outer edge of the semi-transparent layer 12 is circular and the shape of the continuous outer edge of the light source 11 is square. In other embodiments, the shapes of the continuous outer edges of the semi-transparent layer 12 and the light source 11 may be any shape such that the shapes are different. In other embodiments, the shapes are the same.

The semi-transparent layer 12 of any of the above described embodiments may be black, to absorb light transmitted towards the light source 11, such as ambient indoor lighting, or white to reflect light transmitted towards the light source 11. In some embodiments, the semi-transparent layer 12 may be any color suitable to absorb and/or reflect light.

The controller 1, 2, 3, 4 of any of the above described embodiments may further comprise a housing. The housing may contain electronic components which are used to produce a control signal in response to an input to the controller 1, 2, 3, 4, as well as provide power to the light source 11 and the rest of the controller 1, 2, 3, 4. The controller 1, 2, 3, 4 may further comprises a seal to prevent water ingress in to the housing, thereby protecting the electronic components. In some embodiments, the controller 1, 2, 3, 4 does not comprise a housing and is instead configured to be installed in a recess in a structure within a wet environment such as an ablutionary setting, for example a recess formed in a bathroom wall. A seal may provide a sealed volume within the recess to house electronic components of the controller 1, 2, 3, 4.

Figure 5:
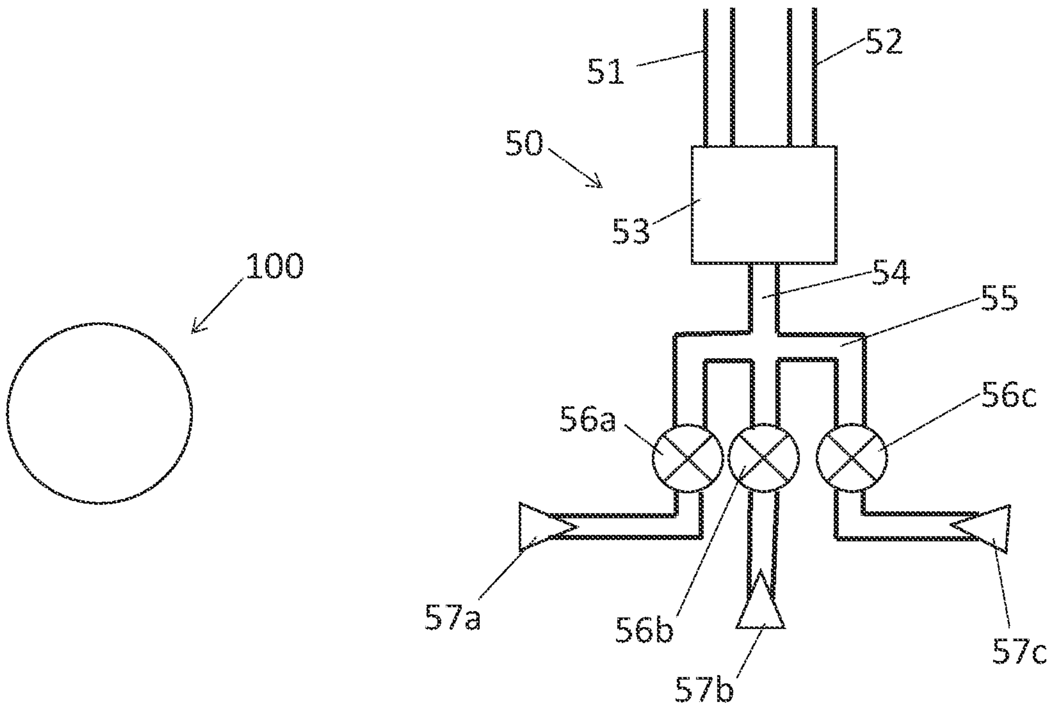
FIG. 5 illustrates schematically a fluid delivery system according to an embodiment.

FIG. 5 illustrates schematically a fluid delivery system 50, for delivering water to a plurality of fluid delivery devices, according to an embodiment. The fluid delivery system 50 comprises a fluid delivery device 57*a*, 57*b*, 57*c* and a controller 100, which may be a controller according to any of the above-described embodiments (e.g. the controllers 1, 2, 3, 4). The controller 100 is operable to control one or more characteristics of the fluid delivered, in use, by the fluid delivery device 57*a*, 57*b*, 57*c*.

The fluid delivery system 50 comprises a first supply pipe 51 and a second supply pipe 52. The first supply pipe 51 and the second supply pipe 52 each convey water to a thermostatic mixer valve 53. The first supply pipe 51 carries hot water and the second supply pipe 52 carries cold water or vice versa.

An outlet pipe 54 carries water at a user-desired temperature from the thermostatic mixer valve 53 and communicates with a manifold 55 having three branches.

Each branch of the manifold 55 has a solenoid shut-off valve 56*a*, 56*b*, 56*c*. A fluid delivery device 57*a*, 57*b*, 57*c* is disposed downstream of each solenoid shut-off valve 56*a*, 56*b*, 56*c*. The solenoid shut-off valves 56*a*, 56*b*, 56*c* are each operable to permit or prevent flow to the fluid delivery device 57*a*, 57*b*, 57*c* downstream thereof.

The fluid delivery devices 57*a*, 57*b*, 57*c* may for example include a plurality of shower sprayheads and/or may include a plurality of spray modes, e.g. provided by different sets of nozzles, from a shower sprayhead.

Operation of the fluid delivery system 50 is controlled by the controller 100. The controller 100 is operably connected, either by a wired connection or a wireless connection, to the thermostatic mixer valve 53. In use, a user activates the fluid delivery system 50 by means an input of the controller 100. For example, where the light source 11 comprises an electronic screen, the light source 11 may display an icon representing an option to activate the fluid delivery system 50. The user may select the icon by means of a touching motion using the touch interface 13. In response, the controller 100 may send a control signal to the thermostatic mixer valve 53 to deliver water to the manifold 55. The light source 11 may subsequently display information indicative of the temperature of water delivered to the manifold 55. To deactivate the fluid delivery system 50, the user may select an appropriate icon displayed by the light source 11 using the touch interface 13. In response, the controller 10 sends a control signal to the thermostatic mixer valve 53 to stop the delivery of water to the manifold 55, and the power supply to the light source 11 is interrupted. The light source 11 subsequently appears hidden.

The controller 100 is also operably connected, either by a wired connection or a wireless connection, to each of the solenoid shut-off valves 56*a*, 56*b*, 56*c*. In use, where the light source 11 comprises an electronic screen for example, the light source 11 may display an icon representing an option to activate each of the fluid delivery devices 57*a*, 57*b*, 57*c*. In response to a user selecting one of the icons, using the touch interface 13 as described above, the controller 100 may send a control signal to the corresponding solenoid shut-off valve 56*a*, 56*b*, 56*c* to permit flow to the corresponding fluid delivery device 57*a*, 57*b*, 57*c*. The user may then select a further icon displayed by the light source 11 to deactivate the fluid delivery device 57*a*, 57*b*, 57*c*.

In some embodiments, the light source 11 of the controller 100 is configured to display information relating to the temperature of water delivered to the manifold 55. For example, in embodiments in which the light source 11 comprises and electronic screen, the electronic screen may be configured to display the temperature of water delivered to the manifold 55 in plain text. In other embodiments in which the light source 11 comprises one or more LEDs, the LED(s) may be configured to illuminate with a first color, for example blue, when the temperature of the water is below a target temperature, and illuminate with a second color, for example red, when the temperature of the water reaches the target temperature. In some embodiments, the light source 11 is configured to display information relating to a currently selected fluid delivery device 57*a*, 57*b*, 57*c*. In some embodiments, the light source 11 may be configured to display information relating to the pressure of water being delivered by the fluid delivery devices 57*a*, 57*b*, 57*c*.

Figure 6:
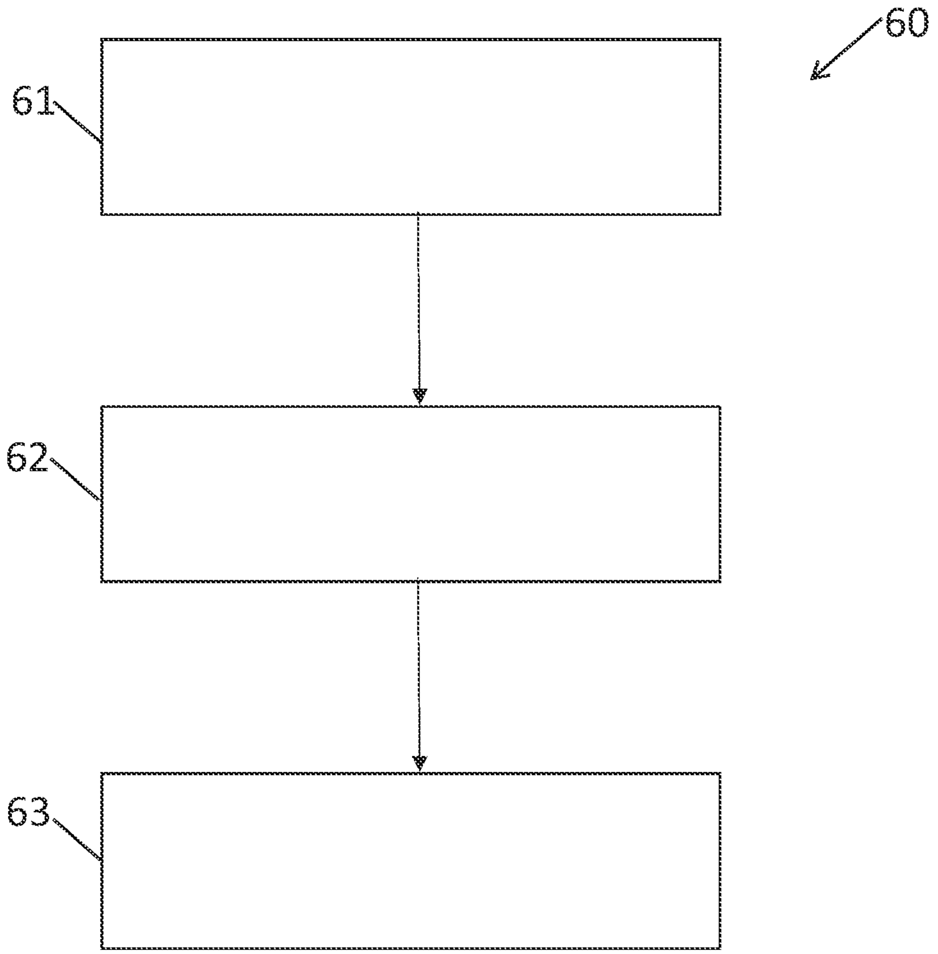
FIG. 6 illustrates a method according to an embodiment.

FIG. 6 illustrates a method 60 of manufacturing a controller for use in a wet environment such as an ablutionary setting, according to an embodiment. The controller comprises a display for displaying information related to the operation of a fluid delivery system. The display comprises a light source, a semi-transparent layer, and a touch interface. The method 60 comprises: providing 61 a light source, a semi-transparent layer, and a touch interface. The method 60 further comprises configuring 63 the light source and the semi-transparent layer such that the semi-transparent layer absorbs or reflects light transmitted towards the light source and allows light transmitted from the light source to be transmitted from the display, such that the light source appears hidden when light is not transmitted from the light source.

The method 60 may further comprise arranging 62 the touch interface between the light source and the semi-transparent layer, or arranging the semi-transparent layer between the light source and the touch interface. The method 60 may further comprise forming the semi-transparent layer integrally with the touch interface.

Figure 7:
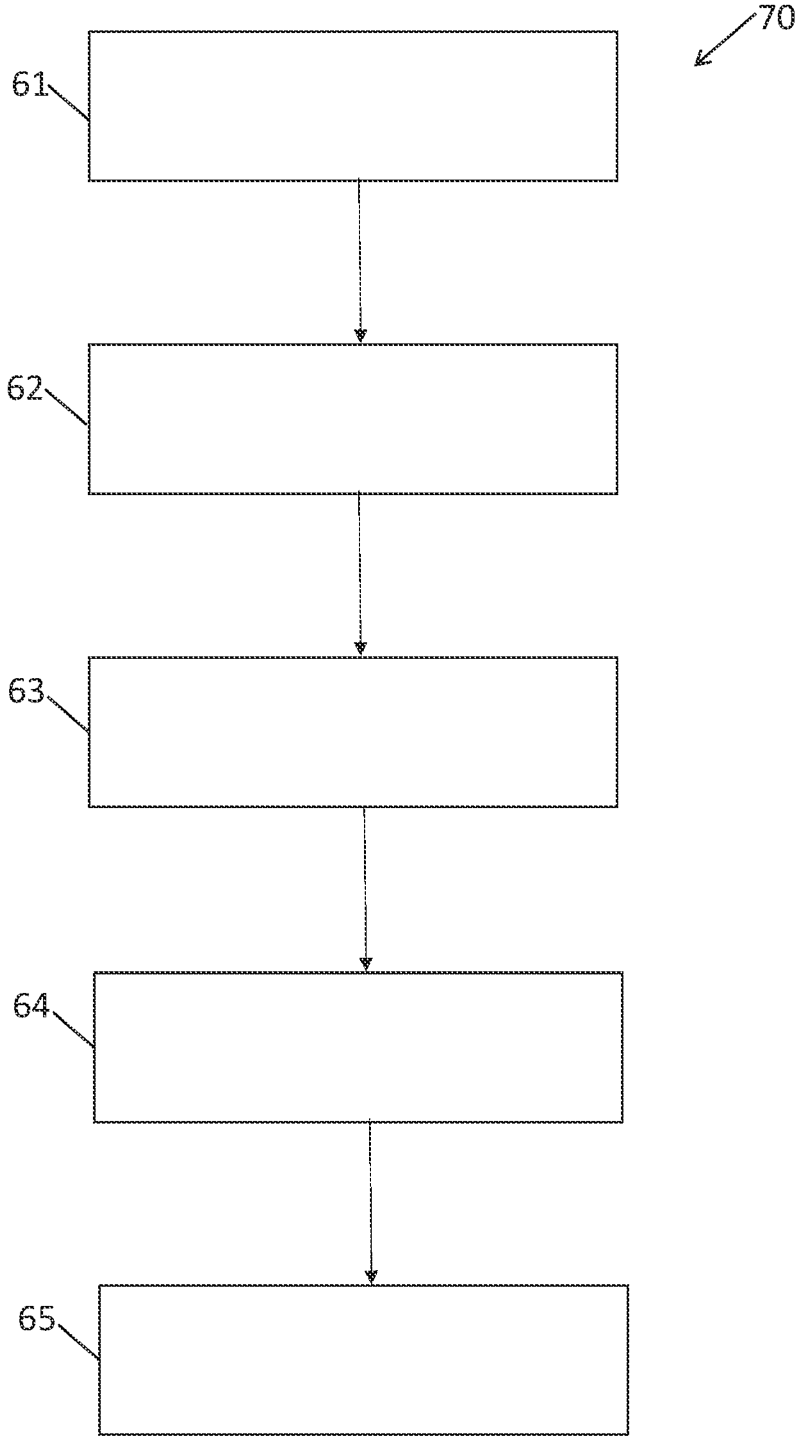
FIG. 7 illustrates a method according to another embodiment.

FIG. 7 illustrates a method 70 of manufacturing a controller according to another embodiment. The method 70 of FIG. 7 has steps in common with the method 60 of FIG. 6. Like reference numerals are used to refer to like steps. The method 70 further comprises providing 64 a transparent layer and forming 65 the semi-transparent layer integrally with the transparent layer.

The controller of either of the methods 60, 70 of FIGS. 6 and 7 may comprise any one of the controllers 1, 2, 3, 4 described above.

FIGS. 8*a-f* show a schematic representation of a method according to an embodiment. The method may be described as an in-mold labelling (IML) process. The method may be used to manufacture a controller according to an embodiment described herein.

Figure 8A:
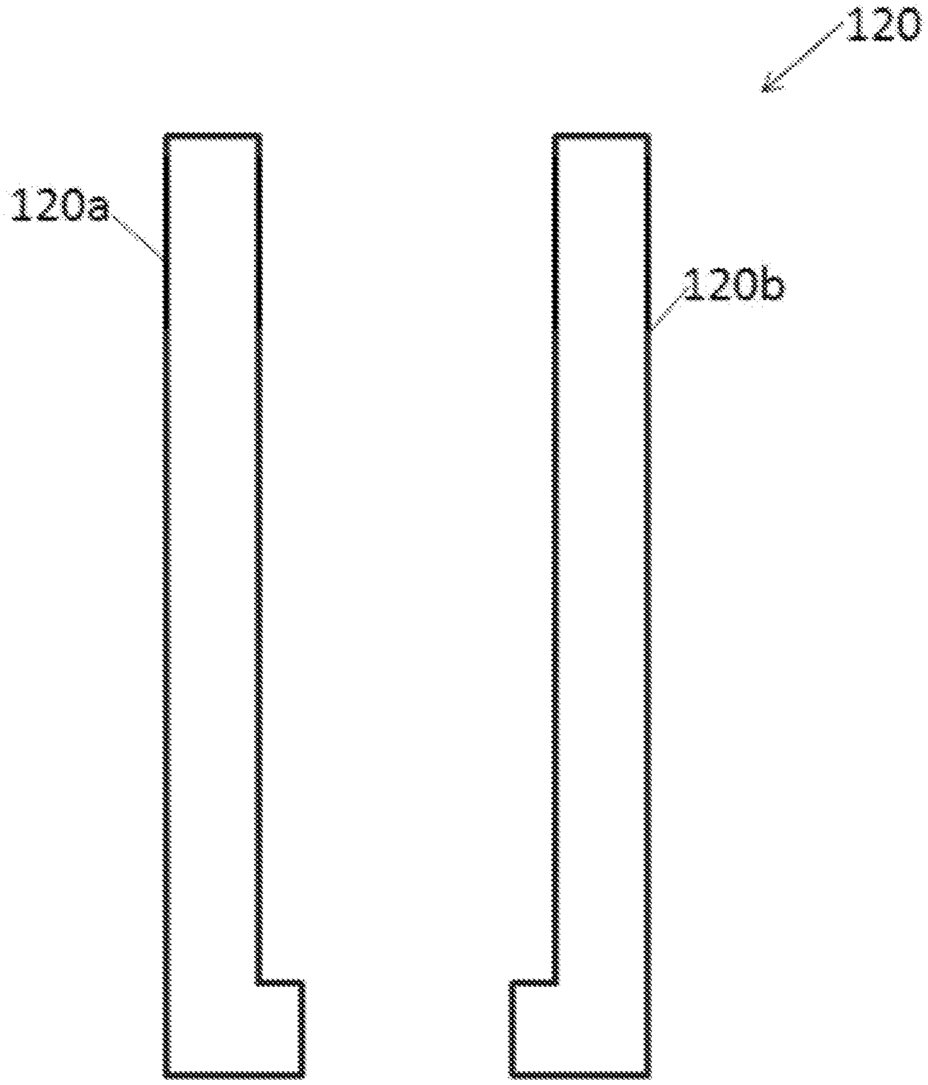
FIGS. 8*a-f* show a schematic representation of a method according to an embodiment.
Figure 8B:
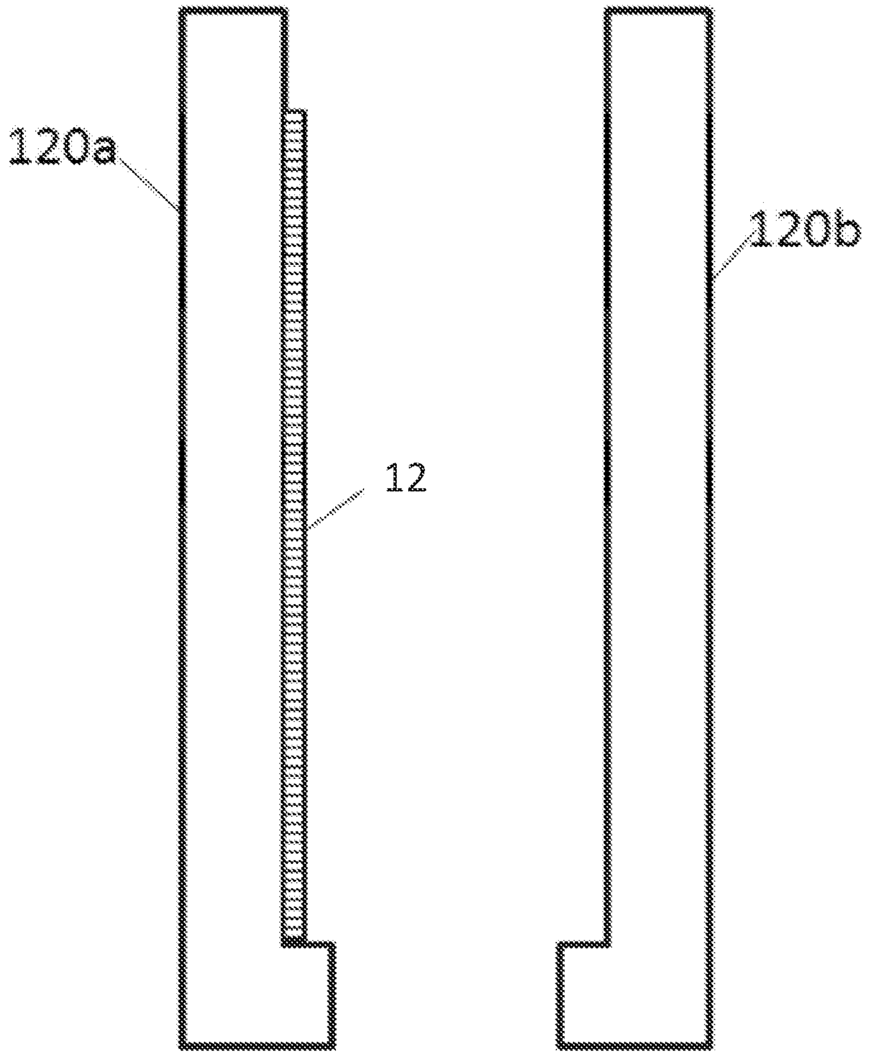
Figure 8C:
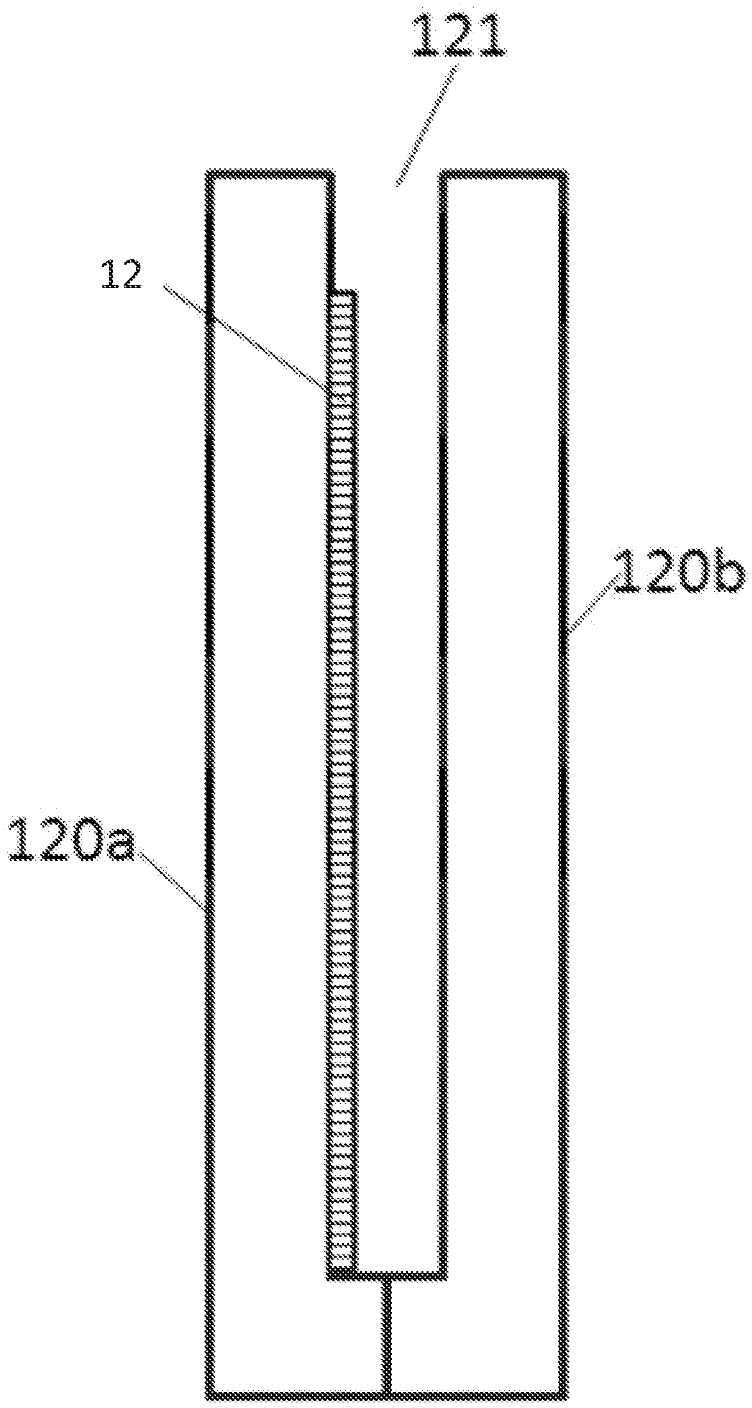
Figure 8D:
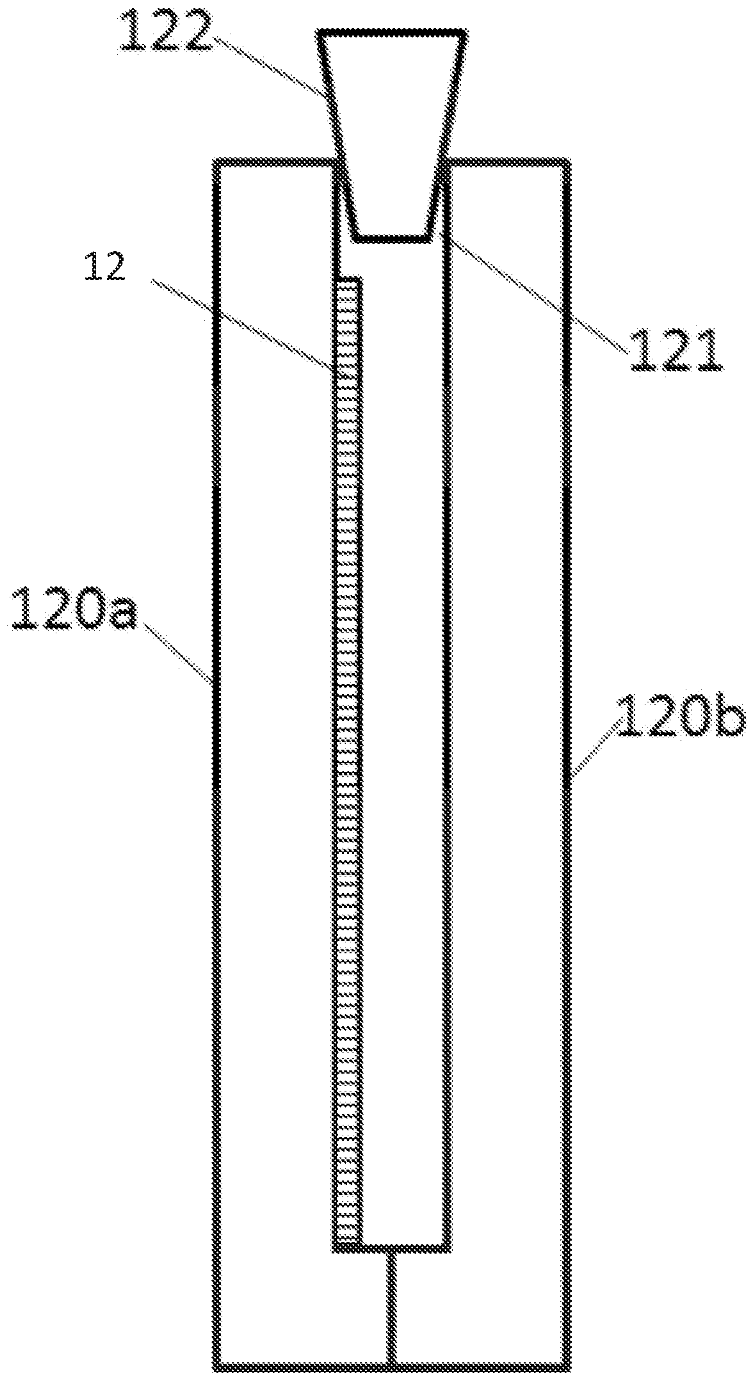
Figure 8E:
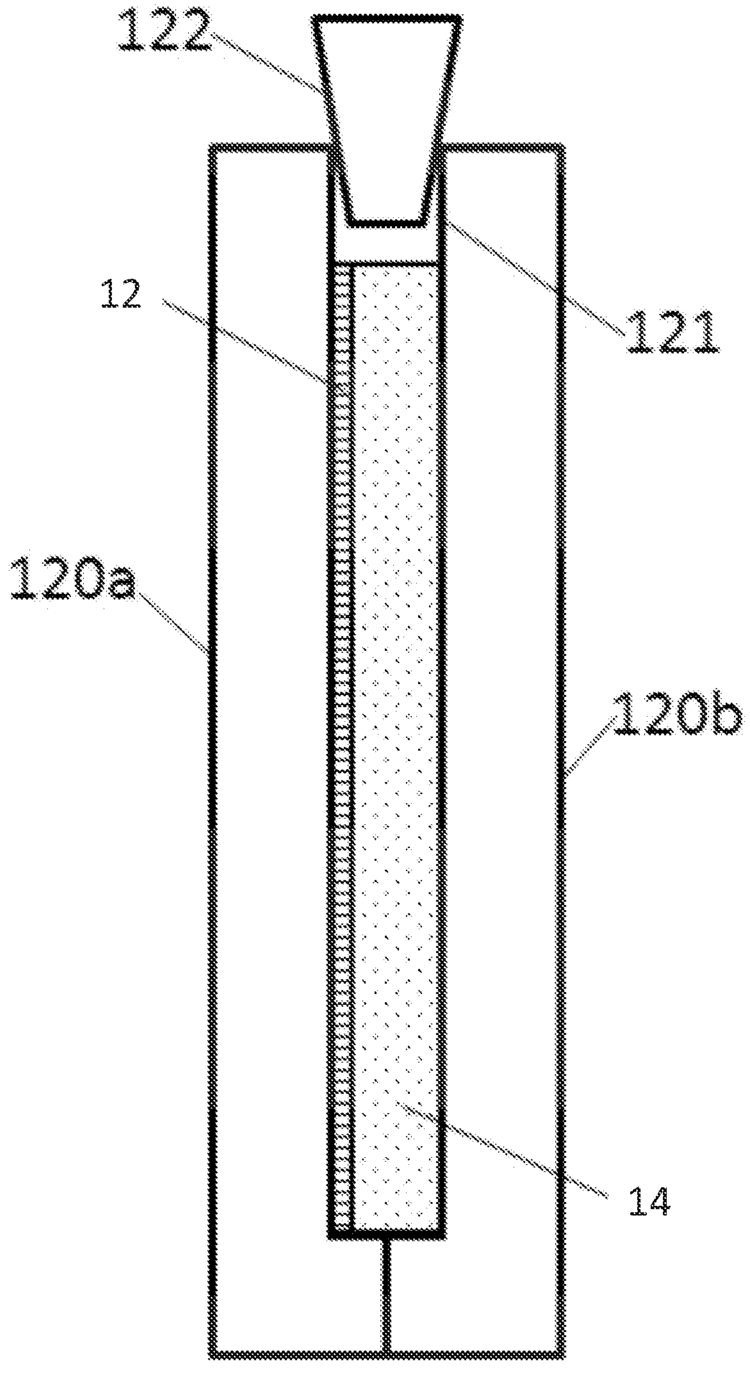
Figure 8F:
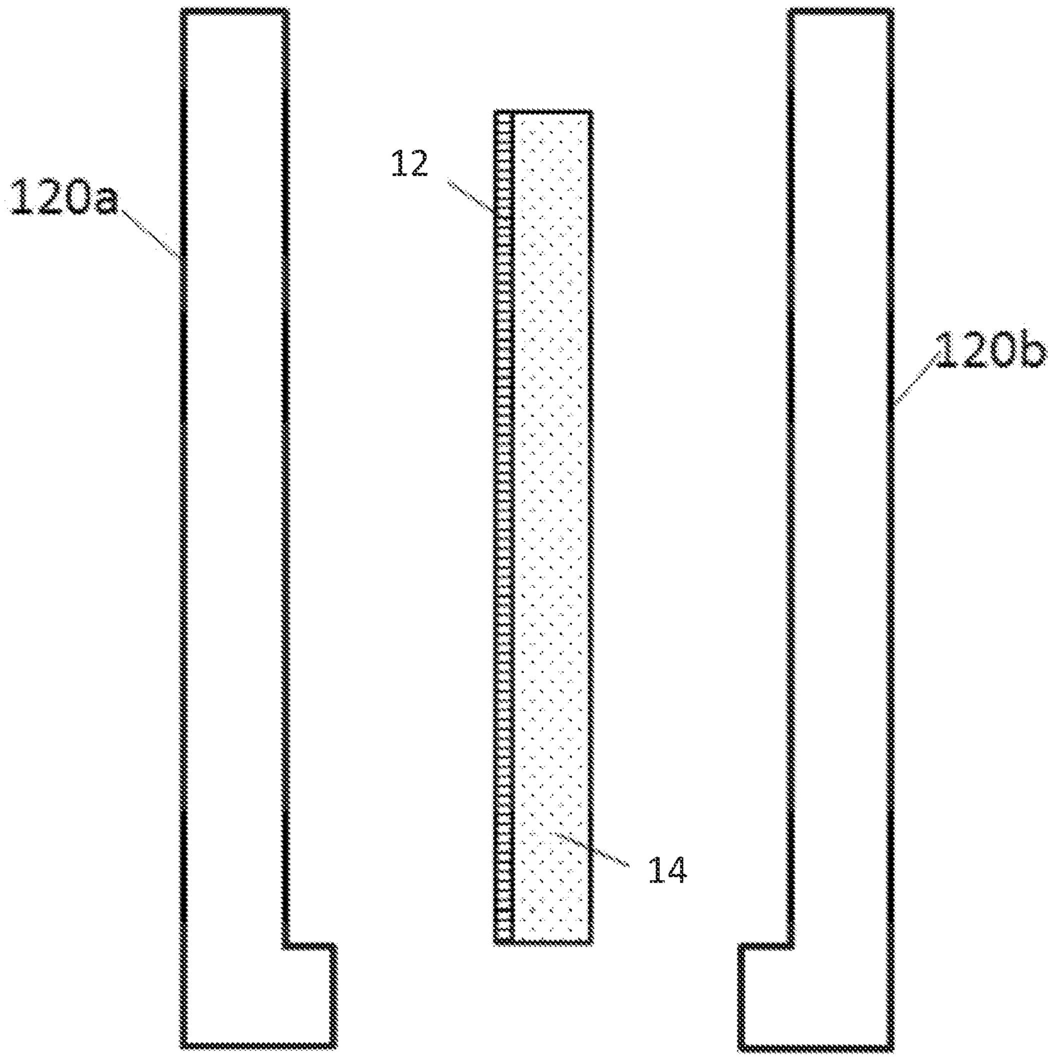

The method begins by providing a mold 120 as shown in FIG. 8*a*. The mold comprises a first part 120*a* and a second part 120*b*. The first part 120*a* and the second part 120*b* are attachable to one another. A semi-transparent layer 12 having the form of a film is inserted in to the mold 120 as shown in FIG. 8*b*. The semi-transparent layer 12 may be secured to the first part 120*a* of the mold 120 to hold it in place during the molding process. The first part 120*a* and the second part 120*b* of the mold 120 are then attached to one another as shown in FIG. 8*c*. An opening 121 is provided at the top of the mold 120 when the first and second parts 120*a*, 120*b* are attached to one another. A nozzle 122 is then inserted in to the opening 121, as shown in FIG. 8*d*. Molten material, such as molten polycarbonate, poly methyl methacrylate (PMMA) or any other suitable plastics material, is then injected in to the mold 120 via the nozzle 122. This forms the transparent layer 14 as shown in FIG. 8*e*. The nozzle 122 is then removed from the opening 121, the first and second parts 120*a*, 120*b* of the mold 120 are detached from one another, and the transparent layer 14 and the semi-transparent layer 12 are removed from the mold 120 as a single piece.

Alternatively, the semi-transparent layer 12 may be secured in the second part 120*b* of the mold 120 during the in-mold labelling process.

The controllers disclosed herein provide a hidden until lit effect under ambient lighting conditions, which may sometimes be termed a dead front effect. As will be appreciated, the provision of this effect may depend inter alia upon balancing the brightness of the light source with the transmissivity (opacity), thickness and proximity of the semi-transparent layer.

It will be understood that various modifications and improvements can be made without departing from the concepts disclosed herein. Except where mutually exclusive, any of the features may be employed separately or in combination with any other features and the disclosure extends to all combinations and sub-combinations of one or more features disclosed herein.

What is claimed is:

1. A controller for use in a wet environment such as an ablutionary setting, comprising a display for displaying information related to the operation of a fluid delivery system, the display comprising:

an anterior side and a posterior side;

a light source adjacent the anterior side;

a semi-transparent layer; and a space between the light source and the semi-transparent layer, the space consisting of a touch interface having a first side and a second side, wherein the first side is attached to the light source and the second side is attached to the semi-transparent layer;

wherein the touch interface is configured to provide an input to the controller, wherein the semi-transparent layer is integrally formed with the touch interface;

wherein the touch interface is directly coupled to the light source and is arranged between the light source and the semi-transparent layer such that the semi-transparent layer is adjacent the posterior side, or the semi-transparent layer is arranged between the light source and the touch interface such that the touch interface is adjacent the posterior side;

wherein a thickness of the touch interface is less than about 10 mm such that information represented by the light source is visible; and wherein the light source and the semi-transparent layer are configured such that the semi-transparent layer absorbs or reflects light transmitted towards the light source and allows light transmitted from the light source to be transmitted from the display, such that the light source appears hidden when light is not transmitted from the light source.

2. The controller of claim 1, wherein the semi-transparent layer comprises an opacity selected such that ambient indoor lighting is reflected or absorbed by the semitransparent layer and light transmitted from the light source is transmitted through the semitransparent layer.

3. The controller of claim 1, wherein the light source is configured to transmit light having an intensity measured at the semi-transparent layer greater than an intensity of ambient indoor lighting measured at the semi-transparent layer.

4. The controller of claim 1, wherein a maximum distance between the light source and the semi-transparent layer is such that light transmitted from the light source is transmitted through the semi-transparent layer.

5. The controller of claim 1, wherein the touch interface is selected from the group consisting of a capacitive touch interface, a resistive touch interface, a surface acoustic wave interface, and an infrared interface.

6. The controller of claim 5, wherein the touch interface is a capacitive touch interface and the capacitive touch interface comprises an indium tin oxide layer.

7. The controller of claim 1, wherein the display further comprises a transparent layer, and the transparent layer is arranged between the light source and the touch interface, or between the touch interface and the semi-transparent layer, or between the light source and the semi-transparent layer.

8. The controller of claim 1, wherein the semi-transparent layer is black or white.

9. The controller of claim 1, wherein a shape of a continuous outer edge of the semi-transparent layer as viewed in a direction extending from the semi-transparent layer toward the light source is different from a shape of a continuous outer edge of the light source as viewed in the same direction.

10. The controller of claim 1, wherein the light source comprises an electronic screen.

11. The controller of claim 10, wherein the electronic screen comprises a liquid-crystal display, optionally wherein the light source comprises one or more LEDs behind the liquid-crystal display to provide backlighting.

12. The controller of claim 10, wherein the electronic screen comprises an LED screen.

13. The controller of claim 1, wherein the light source comprises an LED.

14. A method of manufacturing a controller for use in a wet environment such as an ablutionary setting, the controller comprising a display for displaying information related to the operation of a fluid delivery system and for providing an input to the controller, the display comprising:

an anterior side and a posterior side, a light source adjacent the anterior side, a semi-transparent layer, and a space between the light source and the semi-transparent layer, the space consisting of a touch interface having a first side and a second side, wherein the first side is attached to the light source and the second side is attached to the semi-transparent layer, wherein the semi-transparent layer is integrally formed with the touch interface, wherein a thickness of the touch interface is less than about 10 mm such that information represented by the light source is visible, and wherein the touch interface is directly coupled to the light source and is arranged between the light source and the semi-transparent layer such that the semi-transparent layer is adjacent the posterior side, or the semi-transparent layer is arranged between the light source and the touch interface such that the touch interface is adjacent the posterior side;

the method comprising:

providing a light source, a semi-transparent layer, and a touch interface; and configuring the light source and the semi-transparent layer such that the semitransparent layer absorbs or reflects light transmitted towards the light source and allows light transmitted from the light source to be transmitted from the display, such that the light source appears hidden when light is not transmitted from the light source.

15. The method of claim 14, wherein the display further comprises a transparent layer, the method further comprising providing a transparent layer and forming the semi-transparent layer integrally with the transparent layer.

16. A controller for use in a wet environment such as an ablutionary setting, comprising a display for displaying information related to the operation of a fluid delivery system, the display comprising:

an anterior side and a posterior side;

a light source adjacent the anterior side;

a semi-transparent layer; and a space between the light source and the semi-transparent layer, the space consisting of a touch interface having a first side and a second side, wherein the first side is attached to the light source and the second side is attached to the semi-transparent layer;

wherein the touch interface is configured to provide an input to the controller, wherein the semi-transparent layer is integrally formed with the touch interface;

wherein the touch interface is arranged between the light source and the semi-transparent layer such that the semi-transparent layer is adjacent the posterior side, or the semi-transparent layer is arranged between the light source and the touch interface such that the touch interface is adjacent the posterior side;

wherein a thickness of the touch interface is less than about 10 mm such that information represented by the light source is visible, and wherein a maximum thickness of the semi-transparent layer is 0.2 mm; and wherein the light source and the semi-transparent layer are configured such that the semi-transparent layer absorbs or reflects light transmitted towards the light source and allows light transmitted from the light source to be transmitted from the display, such that the light source appears hidden when light is not transmitted from the light source.

* * * * *